United States Patent
Joublin et al.

(10) Patent No.: US 8,069,042 B2
(45) Date of Patent: Nov. 29, 2011

(54) USING CHILD DIRECTED SPEECH TO BOOTSTRAP A MODEL BASED SPEECH SEGMENTATION AND RECOGNITION SYSTEM

(75) Inventors: Frank Joublin, Mainhausen (DE); Holger Brandl, Offenbach am Main (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 1087 days.

(21) Appl. No.: 11/859,114

(22) Filed: Sep. 21, 2007

(65) Prior Publication Data

US 2008/0082337 A1    Apr. 3, 2008

(30) Foreign Application Priority Data

Sep. 29, 2006    (EP) .................................... 06020644

(51) Int. Cl.
*G10L 15/06*    (2006.01)
*G10L 15/04*    (2006.01)
(52) U.S. Cl. ......... 704/244; 704/243; 704/253; 704/254
(58) Field of Classification Search .................. None
See application file for complete search history.

(56) References Cited

U.S. PATENT DOCUMENTS

| | | | |
|---|---|---|---|
| 5,659,662 A | | 8/1997 | Wilcox et al. |
| 6,272,463 B1 * | | 8/2001 | Lapere .......................... 704/248 |
| 6,912,499 B1 * | | 6/2005 | Sabourin et al. .............. 704/243 |
| 7,216,079 B1 * | | 5/2007 | Barnard et al. ............... 704/244 |
| 7,472,066 B2 * | | 12/2008 | Kuo et al. ..................... 704/266 |
| 7,533,019 B1 * | | 5/2009 | Hakkani-Tur et al. ........ 704/252 |

OTHER PUBLICATIONS

Collat, A. et al. "Unsupervised bootstrapping of diphone-like templates for connected speech recognition," Acoustics, Speech, and Signal Processing, IEEE International Conference on ICASSP '87.*
Nakagawa, S. et al. "A method for continuous speech segmentation using HMM," Pattern Recognition, 1988., 9th International Conference on.*
Wessel, F. et al. "Unsupervised training of acoustic models for large vocabulary continuous speech recognition," Speech and Audio Processing, IEEE Transactions on, Issue Date: Jan. 2005.*
European Search Report, EP 06020644, Dec. 19, 2006, 10 pages.

(Continued)

*Primary Examiner* — Matthew Sked
(74) *Attorney, Agent, or Firm* — Fenwick & West LLP

(57) ABSTRACT

A method and system for obtaining a pool of speech syllable models. The model pool is generated by first detecting a training segment using unsupervised speech segmentation or speech unit spotting. If the model pool is empty, a first speech syllable model is trained and added to the model pool. If the model pool is not empty, an existing model is determined from the model pool that best matches the training segment. Then the existing module is scored for the training segment. If the score is less than a predefined threshold, a new model for the training segment is created and added to the pool. If the score equals the threshold or is larger than the threshold, the training segment is used to improve or to re-estimate the model.

15 Claims, 2 Drawing Sheets

OTHER PUBLICATIONS

Maokuan, L. et al., "Unlabeled Data Classification Via Support Vector Machines and k-means Clustering," Proceedings of the International Conference on Computer Graphics, Imaging and Visualization, CGIV 2004, Proceedings, Jul. 26-29, 2004, pp. 183-186.

Murthy, H.A. et al., "Automatic Segmentation and Labeling of Continuous Speech Without Bootstrapping," EUSIPCO, Poster-presentation, 2004, [online] [Retrieved on Dec. 1, 2006] Retrieved from the Internet<URL:http://lantana.tenet.res.in/Publications/Speech/eusipco.pdf>.

Pham, T., "Alignment-Free Sequence Comparison with Vector Quantization and Hidden Markov Models," Proceedings of the 2003 IEEE Bioinformatics Conference, CSB 2003, Aug. 11, 2003, pp. 534-535.

Salvi, G., "Ecological Language Acquisition Via Incremental Model-Based Clustering," Interspeech 2005, Sep. 4-8, 2005, Lisbon, Portugal, pp. 1181-1184.

Sarada, G.L. et al., "Automatic Transcription of Continuous Speech Using Unsupervised and Incremental Training," Poster-Presentation, InterSpeech 2004, 17 pages.

* cited by examiner

USING CHILD DIRECTED SPEECH TO BOOTSTRAP A MODEL BASED SPEECH SEGMENTATION AND RECOGNITION SYSTEM

FIELD OF INVENTION

The present invention relates to a technique that uses the properties of child directed speech to learn the acoustical structure of speech using a distinct model for each unit of speech. The resulting acoustic model may, for example, be used for speech segmentation, syllable detection or speech recognition in multi-modal systems. The present invention also relates to a system that recognizes and learns the structure of speech for application in automatic speech recognition systems and speech synthesis systems.

BACKGROUND OF THE INVENTION

Generally, the speech recognition research aims to build systems that automatically acquire the structure and meaning of spoken language. But to this day, all common automatic speech recognition (ASR) frameworks are designed to detect predefined words using a predefined grammar. There is the problem that no learning at all is possible with such systems: the underlying models are trained using annotated speech databases in advance and remain fixed during recognition. Although it is clear that human-like speech processing involves learning even during recognition, not much effort was made to develop online-learning systems. So far, all of the conventional approaches have failed to provide computational models for the speech acquisition.

To enable systems to recognize the meaning of speech in a completely unsupervised manner, it is first necessary to acquire the acoustic structure of the language. The reason for acquiring the acoustic structure of the language is that it is necessary to segment a distinct acoustic event in a speech to assign meaning to the acoustical event. Therefore, learning of the speech segmentation must, at least to some extent, precede the learning of the speech semantics. The best segmentation results will be obtained if the model used for segmentation captures the acoustical structure of the language to be segmented as much as possible. This will be the case if each basic unit of speech is modeled by a distinct model. These basic speech units (SU) may be defined in different ways based on linguistic knowledge. The basic speech units need to be chosen by finding a compromise between a low number of speech unit (SU) models to be estimated and more complete capturing of the acoustical speech structure.

Methods used in known speech recognition systems to generate an acoustic model (AM) will be described first.

Supervised Acoustic Model Acquisition

In speech processing, Acoustic Model Acquisition (AMA) refers to the process of using annotated speech utterances to estimate the parameters of models for basic speech units (SU), like phonemes or syllables. Conventionally, there is no method to learn the speech unit (SU) models in an unsupervised manner. To distinguish between the supervised approaches and the method for unsupervised acoustic model acquisition, the former will be referred to as Supervised AMA and the latter as Unsupervised AMA, respectively herein.

Model training methods strongly depend on the mathematical structure used to model the distinct speech units (SU). Hidden Markov Models (HMM) are usually used as speech unit (SU) models although there were a few attempts to replace the HMM. The reason is that given an annotated speech-database, a bunch of HMM centric methods exists that may be applied to train the different speech unit (SU) models. Because annotations are only available for pre-recorded speech utterances, model training must be carried out off-line before the models may be used for online speech recognition tasks. Additionally, the methods for the common HMM training require a large amount of data to estimate the parameters of the speech unit (SU) models; and hence, are not suitable for online learning.

During recognition, the estimated speech unit (SU) models are concatenated to word models using a predefined word-dictionary. The generated word models are subsequently embedded into a large recognition model according to a grammar which defines possible word transitions. Using incoming speech data, the best path through the recognition model is determined which directly leads to a sequence of detected words, i.e. the most likely sequence of speech units (SU).

Other than the restriction of off-line training, another problem with supervised AMA is that it is not possible to model every possible utterance with extremely huge (but always finite) amounts of annotated training data. Therefore, given an annotated training database to use for supervised syllable-based AMA, it is always possible to imagine syllables that are not modeled due to the lack of suitable training data.

Supervised Speech Segmentation

Other than artificial neural networks commonly trained to detect segment onsets and rely on segment or at least onset-annotated speech databases, the major focus in supervised speech segmentation research is about HMM related techniques for segment spotting. For that purpose HMM based keyword-spotting was proposed for speech recognition. Single speech unit (SU) models (also referred to as keyword models) are commonly embedded into a HMM with a dedicated filler model inserted between each model transition. The filler-model or garbage-model is designed to model all parts in the processed utterances that are not described by a speech unit (SU) model. Such systems give a high quality of segmentation. The single speech unit (SU) models must be trained in advance using annotated speech data.

To enable systems trained using such method to cope with non-restricted spontaneous speech utterances, the supervised AMA described above was applied to larger speech databases for training. The basic idea of such attempts is to avoid the use of theoretically and practically difficult concept of filler-model or garbage-model. But no matter how much data is used for training, not all speech units (SU) occurring later during the unsupervised recognition or segmentation may be handled by such an approach.

In general the choice of an appropriate filler model is a major drawback of the HMM-based segment spotting. Recently very few works were presented that do not rely on filler models for segment spotting. Such methods, however, require the annotated speech for speech unit (SU) model training.

Unsupervised Speech Segmentation

Although model-based speech segmentation is generally known as being more powerful, approaches that are not model-based have the benefit of working from scratch without any preparatory training. For example, simple energy based level-tracking for segment generation may be implemented using less than half a dozen predefined parameters. Most unsupervised speech segmentation methods have in common that the speech signal is mapped to a one-dimensional feature space where minima are used to generate segment boundaries dependent on a given sensitivity threshold.

The reason that the approaches not based on model is less powerful compared to the model-based (and so far supervised) approaches is that the structure of speech is encoded using only a small set of parameters. To be more precise, approaches that are not model-based do not include dedicated models for each basic unit of speech as in the case of the model-based speech processing. Although this is sufficient for some applications like single word voice control interfaces, the segmentation performance is far beyond the need required for segmenting spontaneous speech in a human like manner.

A few basic attempts were made using recursive neural network models. After training, these models were able to generalize from utterance boundaries to the word boundaries inside of the utterances. Although hit:false-alarm ratios of 2.3:1 were achieved with such neural network based methods, it is clear that these are not suitable for realistic speech segmentation tasks because of the limited memory capacity. Additionally, all reported ANN based approaches use manually annotated symbolic feature corpora. When restricted to a single speech model, such methods fail to generate segmentation results comparable to the model-based segmentation.

In Hema A. Murthy, T. Nagaraj an, and N. Hemalatha, "Automatic segmentation and labeling of continuous speech without bootstrapping," EUSIPCO, Poster-presentation, 2004, and G. L. Sarada, N. Hemalatha, T. Nagarajan, and Hema A. Murthy, "Automatic transcription of continuous speech using unsupervised and incremental training," Poster-Presentation, InterSpeech 2004, the speech signal to be transcribed is segmented into syllable-like units by an unsupervised method. Similar segments are then grouped together using an unsupervised clustering technique. For each cluster, a dedicated model is derived.

Although this method is appealing, it assumes that the set of segments contains all syllables of the language to model. This approach, however, does not allow online training. Additionally, it uses the unsupervised segmentation method to find all the syllables.

In Giampiero Salvi, "Ecological language acquisition via incremental model-based clustering," 2005, unsupervised incremental clustering of feature frames is applied to child directed speech to estimate a set of Gaussian distributions. These are assumed to model the underlying phonetic classes contained in the utterances for training. Although the approach is based on phonetic models, it is perceptually motivated because no annotation was used. Although such unsupervised approach seems to be appealing, the resulting phonetic models may delineate speech on a level that is too basic to be a realistic solution for speech processing. Indeed no property of speech has been exploited and the investigated problem may be reduced to online-clustering of vectors.

SUMMARY OF THE INVENTION

It is an object of the present invention to provide an improved automated method and system for the unsupervised acquisition of an acoustic model.

The idea of the present invention is to combine simple unsupervised and supervised speech segmentation methods to bootstrap a model-based language representation from scratch. As long as there is no model for speech units, the bootstrapping relies solely on unsupervised segmentation to generate training segments for model creation and training. As soon as new models are derived, the new models are used for model-based segment detection to generate additional training segments.

In one embodiment of the present invention, the speech database required for training is set so that the speech database includes speech data that is similar to child directed speech (CDS) used by parents to communicate with their children during their first years of life.

In one embodiment of the present invention, the speech data is assumed to have good intelligibility and is spoken with a low speech rate and consists of some amount of single word utterances. These short utterances bounded by marginal breaks may often consist of only one syllable. If the system acquired first models by using solely these monosyllabic training segments provided by the unsupervised speech segmenter, transition to more and more complex training speech becomes possible.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE FIGURES

The teachings of the present invention can be readily understood by considering the following detailed description in conjunction with the accompanying drawings.

DETAILED DESCRIPTION OF THE INVENTION

Figure 1:
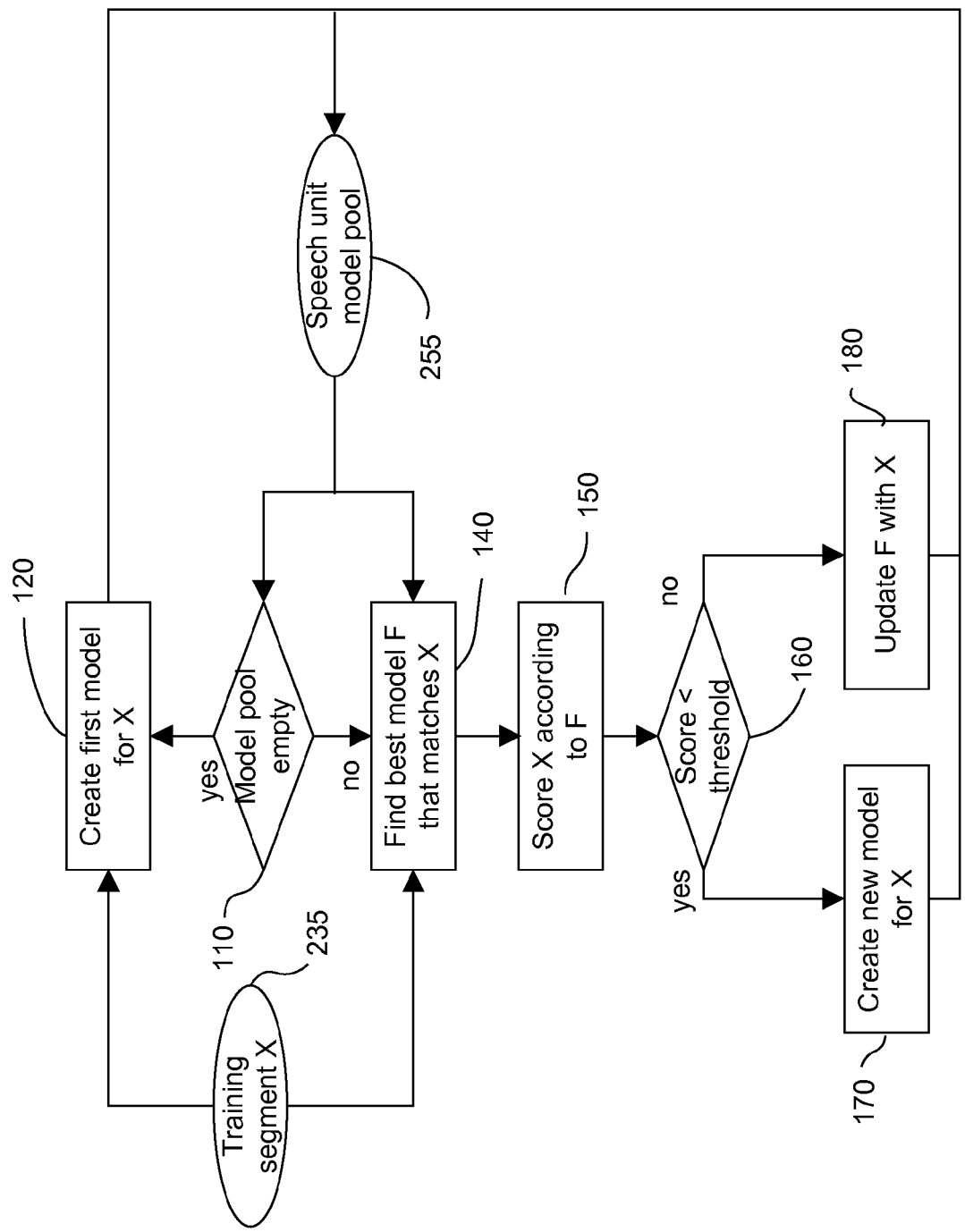
FIG. 1 is a flowchart illustrating a method for acquiring a pool of speech syllable models, according to an embodiment of the present invention.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The Choice of the Basic Speech Unit (SU) and its Model

The first step of setting up a model-based speech processing framework is to choose an appropriate basic unit of speech to be modeled. The state of art Hidden-Markov-Model (HMM) based speech recognizers commonly rely on models for phonemes. A phoneme is a set of speech sounds that is sufficient to distinguish between any two different words of a language. Although only a small set of phonemes is theoretically sufficient to express each word in a language, it is often necessary to further model transitions between phonemes to cope with co-articulatory effects.

For an unsupervised speech acquisition framework, the linguistic concept of phonemes is not suitable. To bootstrap an acoustic model-based speech representation in a child-like way, it is necessary to employ a more perceptual concept like the syllable. A syllable may be defined as a set of subsequent voiced sounds with optional initial and final consonantal margins. Although a perceptual definition of the syllable is used herein, linguistic definitions of syllable is also applicable.

It should be distinguished that the use of syllables for supervised AMA was motivated mainly to avoid complex multi-phoneme modeling and retain a proper modeling of co-articulation effects whereas in the embodiments of the present invention, the syllables are used to allow unsupervised perceptual-centric speech structure acquisition.

Although HMMs are well suited as mathematical models for different speech units (SU), the approach described herein is not restricted to HMM as in most ASR frameworks that are designed based on the available computational methods of HMM. Instead, different types of speech unit (SU) model may be used in the unsupervised AMA framework as long as following requirements are met: (1) the model can be used to spot its modeled speech unit (SU) in a speech stream, (2) the model is able to use one or several speech snippets as training segments, and (3) the model is capable of computing reconstruction score given a segment of speech.

The Bootstrapping Process

FIG. 1 is a flowchart illustrating a method for acquiring a pool of speech syllable models, according to one embodiment of the present invention. Assume X is a segment of speech found using segment spotting or unsupervised speech. That is, the source of the segment may either be an unsupervised speech segmenter or an already existing speech unit (SU) model that has spotted a representative of itself. In one embodiment of the invention, segments may be generated using an unsupervised energy based speech segmentation approach or a filler-model-free keyword detection method based on HMM.

In step 110, it is decided whether the model pool is empty. If the model pool is empty, then a first speech syllable model is trained and added to the pool in step 120. That is, initially no speech unit (SU) models may be contained in the acoustic model. Therefore, incoming speech is analyzed solely by an unsupervised speech segmentation module. Using child directed speech as an input, it is possible to detect segments of syllable length that are not too difficult to discern from the speech stream (that is, the speech is easy to segment, and the rate of speech is not too fast).

These initial training segments may be used for training a first syllable model. Because all of the initial training segments are designed not to contain the same syllable, the generated model should be regarded as a general syllable model and not as a model of a specific syllable.

If the model pool is not empty, then the method branches to step 140 where the model F already existing in the pool P that most likely matches the given segment X is determined. Then, in step 150, the determined model F is used to score the segment X.

In step 160, it is determined whether the score obtained in step 150 is less than a predefined threshold. If the score is less than the predefined threshold, a new model is created in step 170 and then added to the pool. Otherwise, the new training segment X is used in step 180 to improve or to re-estimate the model F.

Assume that the acoustic model contains at least one speech unit (SU) model. A new training segment X will be processed via two paths. After the speech unit (SU) model F that best matches the given segment is determined, the process branches to one of the following two paths:

(a) A confidence measure (uses F to score X) is lesser than a user defined threshold. In this case, the model F is unlikely to be an appropriate model for X. Because F was determined to be the best model for X within the current pool, a new model for X is created. In one embodiment, this step may comprise using the model parameters of F for initialization. Then, to differentiate the new model from the model F, the segment X may be utilized to perform a first parameter update.

(b) The confidence measure exceeds the user defined threshold. The model F is likely to be an appropriate to model the current segment X. Therefore, the segment X is be used for improving or re-estimating F.

Because a specific amount of training segments was used to estimate the parameters of a single syllable model, the syllable model may be employed to observe the speech stream. From the speech stream, the syllable model may not detect segments for which the speech unit (SU) has generated the model. Now the model-based detection or segmentation is applied to more parts. Therefore, the speech used for training is possible to deviate from CDS. It is no longer necessary to assume that the segments to be detected by the newly attached speech unit (SU) models are monosyllabic utterances, which was the case when using only the less powerful unsupervised speech segmentation.

The method described above is suitable for an online speech structure acquisition and analysis: Incoming speech may be analyzed on-the-fly based on the existing speech unit (SU) models and the unsupervised speech segmentation method. The segmentation and recognition results may be used for additional model training or external processing or both.

That is, the method described above applies trained models to analyze the speech. If a model was successful in detecting a realization of itself, the segment information due to the location in the speech stream may be used to generate new training segments. These segments may consist of the segment itself, but also include segments generated by using boundary cues of different segments. Using this procedure incrementally, the system may acquire the complete acoustic structure of a language.

That is, if the first training segments are modeled in the pool, the training segments may be used to generate new segments of continuous speech because the model spotter will recognize these modeled segments and their boundaries in the continuous speech. This allows the training segment generator to generate new segments of speech. For example, if the system has segmented the words "this," "is," "red" because they were pronounced in child directed speech (separated from each other), then by encountering a fluently spoken sentence like "this is a red cube," the spotter will segment "this," "is" and "read", allowing the training segment generator to create new training segments "a" and "cube."

Model Pool Size Limitation

Because the above procedure of generating training segments uses two paths, one of which improves the model and the other extending the model pool, it is clear that the number of syllable models in the unsupervised trained acoustic model will increase gradually over time. To ensure that the acoustic model maintain meaningful and compact structure, it is therefore crucial to limit the size of the model pool.

In one embodiment of the present invention, the model pool may be regulated using model spotting coverage and model selectivity. The model spotting coverage describes how accurately a speech signal can be modeled using the existing model pool. The model spotting coverage is "1" if at least one model becomes active (in terms spotting its representative) for each occurring SU or "0" if none of the occurring SU activates a SU model. Partial coverage may be represented by a value between 0 and 1. Based on this measure, criteria can be defined to limit the expansion of developing models.

The model selectivity describes how sparse the SU pool spotting activity is. That is, how many of the segment models are active at the same time. As more of the segment models become active, the more redundant the model pool becomes. Ideally, one model should be active each time. Therefore, the model selectivity might define whether to prune some models in order to achieve a pool that is less redundant. The pruning process implicitly increases the differences between distinct speech unit (SU) models. In one embodiment of the present invention, the model selectivity is implemented by computing a measure of training segment co-occurrences.

For each two syllable models, the matrix-valued measure describes the probability that the syllable models will generate a training segment for bootstrapping the same segment of speech. Such a measure may be computed using long term segmentation activity patterns. For example, if the two syllable models generate training segments for the same segments of speech over a long time, it is clear that both models are related to the same syllable. Using a threshold, such similar models might be pruned or merged based on this co-occurrence measure. Pruning of this kind also ensures sparsity of generated segments. To allow pruning only for redundant model pools, the pruning threshold might be modified depending on the current model spotting coverage. Depending on the default threshold, the acoustic model may contain models only for broad syllable categories or for more specific speech unit (SU) models.

Figure 2:
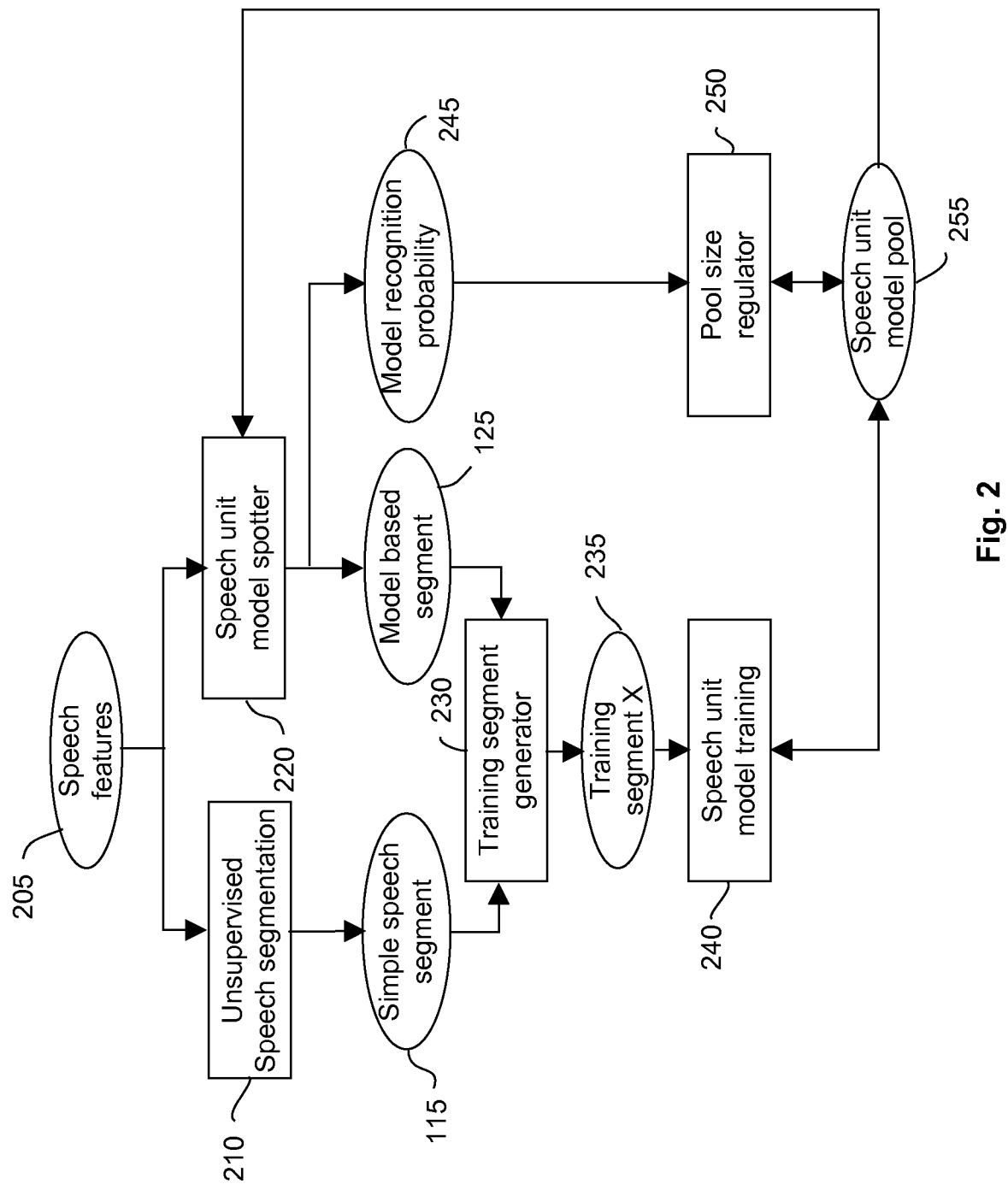
FIG. 2 is a processing graph illustrating a method, according to an embodiment of the present invention.

FIG. 2 is a diagram illustrating a processing graph of a system for acquiring a pool of speech syllable models, according to one embodiment of the invention. Speech features 205 are analyzed by an unsupervised speech segmentation module 210 and a speech unit model spotter 220. The unsupervised speech segmentation module 210 derives a simple speech segment 115 that may be input into a training segment generator 230. The speech unit model spotter 220 derives a model-based segment 125 that may also be provided to the training segment generator 230. The detailed feature extraction is not explained herein because it is not directly related to the embodiments of the present invention.

The training segment generator 230 generates training segments 235 that may subsequently be used by a speech unit model training module 240 in order to train speech unit models (refer to FIG. 1 for detail). The speech unit model training unit outputs trained speech unit models to a speech unit model pool 255. The size of the speech unit model pool 255 may be limited by a pool size regulator 250 based on a model recognition activity 245 of the speech unit model spotter 220.

The embodiments of the present invention rely on speech data which is similar to child directed speech. To enable perceptual processing, syllables are used as basic modeling units instead of phonemes. Unsupervised speech segmentation is used for generating first training segments for model bootstrapping of syllables that are to some extent pre-segmented in the speech stream. Subsequently, existing speech unit (SU) models may be used to generate training segments for more complex utterances for which simple unsupervised speech segmentation does not generate expedient segments. The number of syllable models is limited by using model pruning based on a proposed measure of co-occurring segmentation activities.

Compared with supervised AMA, the acoustic models generated by the embodiments of the present invention contain only syllable models that are actually required to model the already processed speech utterances. Because the proposed unsupervised AMA approach combines the separate stages for training and recognition into one integrated framework, new syllables may be modeled as time progresses, which is not possible using the supervised AMA.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer based method of acquiring a model pool of speech syllable models comprising:
    (a) at a computing device, detecting a training segment using unsupervised speech segmentation or speech unit spotting;
    (b) training a first speech syllable model and adding the first speech syllable model to the model pool responsive to the model pool being empty;
    (c) determining an existing model in the model pool that best matches the training segment responsive to the model pool not being empty, and using the existing model to score the training segment;
    (d) outputting a new model for the training segment and adding the new model to the model pool responsive to the score being less than a predefined threshold;
    (e) outputting a revised model to the model pool, the revised model representing a re-estimated version of the existing model generated from the existing model using the training segment responsive to the score being equal to or larger than the predetermined threshold; and
    (f) repeating steps (a) to (e).

2. The method of claim 1, wherein child directed speech is used as input at least during the training of the first speech syllable model.

3. The method of claim 2, wherein detecting the training segment comprises analyzing an input by an unsupervised speech segmentation module and a model spotter module that uses already acquired models for speech unit based segment.

4. The method of claim 1, wherein outputting the new model for the training segment comprises using model parameters of the existing model.

5. The method of claim 1, further comprising regulating of the model pool.

6. The method of claim 5, wherein regulating of the model pool is based on model spotting coverage.

7. The method of claim 5, wherein regulating of the model pool is based on model selectivity.

8. The method of claim 5, wherein regulating of the model pool comprises determining a score that is a combined measure of model spotting coverage and model selectivity.

9. The method of claim 8, wherein the model selectivity is expressed as training of segment co-occurrence.

10. The method of claim 9, wherein the training segment co-occurrence is measured by a matrix describing for each two speech syllable models probability that the two speech syllable modules will generate a training segment responsive to the same segment of speech.

11. The method of claim 1, wherein each speech syllable model is used for spotting a speech syllable corresponding to the speech syllable model in a speech stream, the speech syllable model uses one or more speech snippets as the training segments; and the speech syllable model generates a reconstruction score for a segment of speech.

12. The method of claim 11, wherein each speech syllable model is a Hidden-Markov-Model (HMM).

13. A computer based system for acquiring a model pool of speech syllable models, the system comprising:
    a speech segmentation module in a computing device for segmenting a speech stream into first speech segments;
    a speech unit model spotter in the computing device for segmenting the speech stream into second speech segments using the speech syllable models;
    a training segment generator in the computing device, the training segment generator coupled to the speech segmentation module and the speech unit spotter for creating training segments from the first speech segments and the second speech segments; and
    a speech unit model training module in the computing device, the speech unit module coupled to the training segment generator for generating a revised speech model syllable based on the training segments.

14. The system of claim 13, further comprising a pool size regulator coupled to the speech unit model spotter for limiting a size of the model pool.

15. A computer program product comprising a non-transitory computer readable medium structured to store instructions executable by a processor in a computing device, the instructions, when executed cause the processor to:
    (a) detect a training segment using unsupervised speech segmentation or speech unit spotting;
    (b) train a first speech syllable model and adding the first speech syllable model to the model pool responsive to the model pool being empty;
    (c) determine an existing model in the model pool that best matches the training segment responsive to the model pool not being empty, and using the existing model to score the training segment;
    (d) output a new model for the training segment and adding the new model to the model pool responsive to the score being less than a predefined threshold;
    (e) output a revised model to the model pool, the revised model representing re-estimated version of the existing model generated from the existing model using the training segment responsive to the score being equal to or larger than the predetermined threshold; and
    (f) repeat steps (a) to (e).

* * * * *